(12) United States Patent
Isard et al.

(10) Patent No.: US 7,714,858 B2
(45) Date of Patent: May 11, 2010

(54) DISTRIBUTED RENDERING OF INTERACTIVE SOFT SHADOWS

(75) Inventors: Michael A. Isard, San Francisco, CA (US); Alan B. Heirich, Half Moon Bay, CA (US); Mark A. Shand, Dampierre Yvellnes (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 2079 days.

(21) Appl. No.: 10/418,502

(22) Filed: Apr. 18, 2003
(Under 37 CFR 1.47)

(65) Prior Publication Data
US 2004/0207623 A1 Oct. 21, 2004

(51) Int. Cl.
*G06T 15/00* (2006.01)
(52) U.S. Cl. .................. 345/426; 345/419; 345/423; 345/428
(58) Field of Classification Search ............ 345/419, 345/421, 423, 426, 425, 428, 619
See application file for complete search history.

(56) References Cited

U.S. PATENT DOCUMENTS

| | | | |
|---|---|---|---|
| 5,692,159 A | 11/1997 | Shand | 703/27 |
| 6,108,734 A | 8/2000 | Shand | 710/105 |
| 6,192,447 B1 | 2/2001 | Shand | 711/111 |
| 6,292,762 B1 | 9/2001 | Moll | 708/160 |
| 6,359,618 B1 | 3/2002 | Heirich | 345/426 |
| 6,516,032 B1 | 2/2003 | Heirich et al. | 375/240.18 |
| 6,771,264 B1 * | 8/2004 | Duluk et al. | 345/426 |
| 7,079,137 B2 * | 7/2006 | Borshukov | 345/426 |

OTHER PUBLICATIONS

Kautz et al., Towards Interactive Bump Mapping with Anisotropic Shift-Variant BRDFs, Aug. 2000, SIGGRAPH/Eurographics, pp. 51-58.*
Lensch et al., Realisric Materials in Computer Graphics, Course Notes SIGGRAPH 2005 Course 10, Jul. 31, 2005, pp. 1-234.*
Dumont et al. Perceptually-Driven Decision Theory for Interactive Realistic Rendering, ACM Transaction on Graphics, Apr. 2003, pp. 152-181.*
Kautz et al, Fast, Arbitrary BRDF Shading for Low-Frequency Lighting Using Spherical Harmonics, The Eurographics Association 2002, pp. 291-296, 335.*

* cited by examiner

*Primary Examiner*—Phu K Nguyen

(57) ABSTRACT

The disclosed embodiments relate to a rendering cluster that renders an image of a scene object. The rendering cluster may comprise an illumination node that produces illumination output based on lighting properties of the scene object and a material node that produces material output based on material properties of the scene object. The illumination output is combined with the material output to form the image.

24 Claims, 2 Drawing Sheets

DISTRIBUTED RENDERING OF INTERACTIVE SOFT SHADOWS

BACKGROUND OF THE RELATED ART

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Two methods of rendering shadows at interactive rates are shadow maps and shadow volumes, both of which can be implemented partially or completely in graphics cards. A shadow map is a two dimensional array of values representing the distance from a light source to the first occluding geometry in the scene, projected onto a plane and sampled at regular intervals. By a suitable sequence of geometric transformations it may be compared to the depth from the eye to the first occluding geometry in the scene, which can be used to calculate if a given pixel in the scene is in shadow or not. However, sampling artifacts may arise in the shadow calculation because geometric transformations used to create the shadow map may not be perfectly aligned.

Shadow maps become inefficient when rendering multiple shadows. For example, to render a scene lighted by an arbitrary number L point lighting sources, twice as many rendering passes (i.e. 2L passes) are needed (L passes to render the shadow maps, and L passes feeding into an accumulation buffer to composite the illumination information from each light in turn). Hardware-accelerated shadow mapping also consumes at least one texture unit which is a scarce resource in current graphics cards.

A shadow volume may represent areas in shadow in a scene by polyhedra enclosing the volumes that are occluded from the light source. Shadow volumes are less subject to sampling artifacts, but are unwieldy for many scenes. Shadow volumes can be used to cast accurate hard shadows without aliasing artifacts, but there is some extra cost in preprocessing the geometry and if the scene is made up of many small objects, for example the leaves of a plant, performance can become limited by stencil-buffer fill rate. It may also be difficult to modify shadow volume techniques to deal with effects such as hair and fog. The present invention may address one or more of the above issues.

BRIEF DESCRIPTION OF THE DRAWINGS

Advantages of one or more disclosed embodiments may become apparent upon reading the following detailed description and upon reference to the drawings in which.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
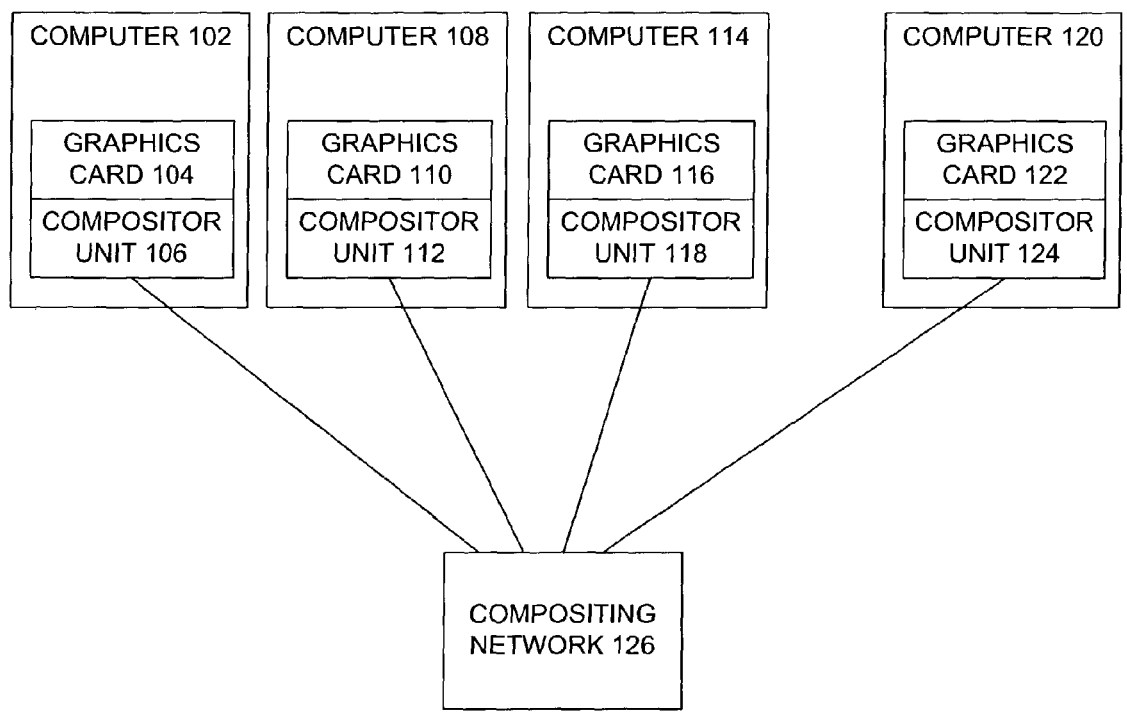
FIG. 1 is a block diagram illustrating a distributed rendering cluster in accordance with embodiments of the present invention.

FIG. 1 is a block diagram illustrating a distributed rendering cluster in accordance with embodiments of the present invention. The distributed rendering cluster is generally referred to by the reference numeral 100. A processor-based computer 102 incorporates a graphics card 104. The graphics card 104 may be adapted to process data relating to an image that is obtained, for example, from a camera, a scanner or the like. Alternatively, the image processed by the graphics card 104 may be created using programming constructs, without reference to a real object. The graphics card 104 may comprise one or more texture units, which may be capable of computing separate aspects of image data. The output of the multiple texture units may be combined together to form an image. A compositor unit 106 may be associated with the graphics card 104 to allow the computer 102 to exchange and combine image data with other computers in the distributed rendering cluster 100.

In addition to the computer 102, the diatributed rendering cluster 100 may comprise processor-based computers 108, 114 and 120, which contain, respectively, graphics cards 110, 116 and 122. The computers 108, 114 and 120 may comprise compositor units 112, 118 and 124, which may be connected through a compositing network 126. As appreciated by those of ordinary skill in the art, the compositor units 106, 112, 118, 124 and the compositing network allow the computers 102, 108, 114 and 120 to exchange information to allow them to function as a distributed rendering cluster. Each computer may work on a portion of a rendering activity, the results of which may be combined via the compositor units 106, 112, 118, 124 and the compositing network 126 for display on one or more display screens. Like the graphics card 104, each of the graphics cards 110, 116 and 122 may comprise one or more texture units, which may be capable of computing separate aspects of image data. As indicated in FIG. 1, there may be any number of intervening computers and associated graphics cards interposed between the computer 114 and the computer 120. The number of computers and associated graphics cards may be changed as required or useful. Each computer and its associated graphics card and compositor unit may be referred to as a rendering node. In recent years, several programmable distributed rendering frameworks have been developed, including Sepia2, which allows a user to specify compositing operators. The connection between rendering nodes via the compositor units 106, 112, 118, 124 and the compositing network 126 may be referred to as a "pipeline."

Rendering nodes (such as the computers 102, 108, 114 and 120) may be arranged in a linear pipeline and each node may generate an image of pixel values, which are computed as a function of a locally rendered image and the output of the preceding render node in the pipeline. This function may be referred to as a compositing operator, which may be programmed in an application-specific manner. The disclosed embodiments take advantage of this programmability to provide a compositing operator suitable for the distributed rendering of global-illumination properties such as shadows.

The disclosed embodiments relate to a custom compositing operator to render a shadow mapped scene on a distributed rendering cluster. Illumination by an arbitrary number L point sources can be rendered by (L/K)+1 nodes where K is the number of texture units on each graphics card 104, 110, 116 and 122. For walkthrough applications each node may require a single rendering pass, while for scenes with moving lights or geometry K+1 passes may be needed per node. In addition, all K texture units are available for rendering material properties allowing a full range of multi-texture material effects.

Shadow maps have become increasingly popular for interactive shadows as hardware support for rendering them has become prevalent. Below is a description of how shadow maps are implemented when depth textures are available, for example, using the ARB_OpenGL extension. Shadow maps may also be implemented somewhat less efficiently without depth textures. A brief discussion of the tradeoffs involved is set forth below.

In order to explain the operation of the present invention, coordinate conventions and transformations set forth in The OpenGL Graphics System, A Specification, version 1.4 ("the OpenGL Specification"), are useful. The OpenGL Specification, which is hereby incorporated by reference, is available from www.opengl.org. Following the notation set forth in the OpenGL Specification, three homogeneous coordinate systems; clip coordinates, world coordinates and light coordinates may be introduced. The geometry of the rendered object is expressed in four dimensional world coordinates wherein a unique point $x = (x, y, z, w)^T$. The geometry can be projected into the eye's viewpoint using a projective transformation matrix $F^c M^c$ to give clip coordinates $x^c = (x^c, y^c, z^c, w^c)^T = F^c M^c x$. Similarly the projective transformation $F^l M^l$ converts world coordinates to light coordinates $x^l = (x^l, y^l, z^l, w^l)^T = F^l M^l x$. Following OpenGL coordinate-transformation conventions, $M^c$ and $M^l$ are typically rigid-body transformations effecting scale and rotation and $F^c$ and $F^l$ are projections to a clip frustum.

An object or scene illuminated by a single point light source may be rendered in two passes. First, the scene may be rendered from the viewpoint of the light source and the resulting image (the shadow map) is stored in a depth texture where $T(u, v)$ is the depth value stored at coordinate $(u, v)$. The shadow map is used to store the scene depth projected into light-view coordinates, so $$T\left(\frac{x^l}{w^l}, \frac{y^l}{w^l}\right) = \frac{z^l}{w^l}$$

Next, the scene is rendered again from the eye's viewpoint with the shadow map bound to one of the texture units of the graphics card. During polygon rasterisation, the four dimensional texture coordinates $x^t = (x^t, y^t, z^t, w^t)$ at pixel $x^c$ are generated using the texture matrix $F^t M^t (F^c M^c)^{-1}$ and thus transformed to light coordinate space. At each pixel the texture hardware is used to read a value $z^m$, which is defined by the relationship:

$$z^m = T\left(\frac{x^t}{w^t}, \frac{y^t}{w^t}\right)$$

from the shadow map and a depth comparison is done; if $z^t/w^t < z^m + \epsilon$ then the pixel is considered to be illuminated, otherwise the pixel is in shadow. The depth bias $\epsilon$ is included to reduce self-shadowing artifacts and should be chosen based on the geometry of the model being used. Percentage closer filtering can be achieved by enabling linear filtering on the texture map using, for example, the ARB_depth texture OpenGL extension, resulting in a per-pixel illumination value $s \in [0, 1]$ which varies from $s=0$ for points completely in shadow to $s=1$ for points which are completely illuminated. Programmable fragment shaders available on some graphics cards may then be used to set the final pixel value $p^f = s \cdot p$ where p is the fully-illuminated pixel color. A fragment shader is a pipeline stage available in some OpenGL compatible graphic cards that allows the user to specify simple sequences of operations that are performed on each pixel in a scene.

When K>1 texture units are available on a graphics card, it may seem attractive to render multiple shadows in one pass by generating K shadow maps from the viewpoints of K different lights and binding each map to a different texture unit. It is then straightforward to compute $s_k$, which is defined to be the illumination coefficient for each light. However, computing the final pixel value $p^f$ may be problematic since the rendering pipeline has already summed the lighting contributions from the K lights into a single pixel color p. This difficulty may be overcome by decomposing the final pixel color into illumination and material properties as described below.

The locally rendered image may be captured by the compositor card using a digital frame buffer to screen interface such as a Digital Visual Interface ("DVI"). Each pixel may be defined to consist of a 24-bit (r, g, b) triplet. The data layout of the compositing function has more flexibility and in general a network pixel can contain more than 24 bits of data to be interpreted in an application-specific manner. This flexibility may be used to decompose the pixel color information into illumination-dependent and material-dependent channels which can then be recombined in a final compositing step as described in the following paragraphs.

A typical pixel lighting equation, taken from the OpenGL specification, gives the final color $p^f$ of a pixel illuminated by L lights as $$p^f = e + m^a \times c^a + \sum_{\lambda=1}^{L} ((m^a \times c_\lambda^a) i_\lambda^a + (m^d \times c_\lambda^d) i_\lambda^d + (m^s \times c_\lambda^s) i_\lambda^s). \quad (1)$$

Here, $\epsilon$ is defined as the light emitted by the material, $m^a$, $m^d$ and are defined to be the ambient, diffuse and specular material colors respectively and $c^a$ is defined as the global ambient illumination. Each light $\lambda$ has ambient, diffuse and specular illumination colors $c_\lambda^a$, $c_\lambda^d$ and $c_\lambda^s$ respectively, and $i_\lambda^a$, $i_\lambda^d$ and $i_\lambda^s$, which are defined, respectively, to be ambient, diffuse and specular attenuation coefficients, which depend on per-pixel lighting parameters such as the location and orientation of the illuminated object, spotlighting, fog and the like. In this notation a bold-face variable u refers to a color vector $(u_r, u_g, u_b)$ and $u \times v$ denotes component multiplication $(u_r v_r, u_g v_g, u_b v_b)$.

The lighting equation may be modified to include shadowing effects by including shadowing coefficients $s\lambda$ as follows:

$$p^f = e + m^a \times c^a + \sum_{\lambda=1}^{L} ((m^a \times c_\lambda^a) i_\lambda^a s_\lambda + (m^d \times c_\lambda^d) i_\lambda^d s_\lambda + (m^s \times c_\lambda^s) i_\lambda^s s_\lambda).$$

which can be rewritten as $$p^f = e + m^a \times (c^a + I^a) + m^d \times I^d + m^s \times I^s \quad (2)$$

where an ambient illumination value $I^a$, a diffuse illumination value $I^d$, and a specular illumination value $I^s$, respectively, may be defined as follows:

$$I^a = \sum_{\lambda=1}^{L} c_\lambda^a i_\lambda^a s_\lambda, \quad I^d = \sum_{\lambda=1}^{L} c_\lambda^d i_\lambda^d s_\lambda, \quad I^s = \sum_{\lambda=1}^{L} c_\lambda^s i_\lambda^s s_\lambda$$

Since $I^a$, $I^d$, and $I^s$ do not depend on $m^a$, $m^d$ or $m^s$ this suggests a strategy for partitioning the compositing pipeline into illumination nodes which take account of lighting parameters and shadowing and material nodes which are programmed with the material properties of the scene objects. The output of the illumination nodes may be referred to as the illumination output and the output of the material nodes may be referred to as the material output. Given a pipeline in which each render node has K active textures, N nodes may be assigned to be illumination nodes allowing NK distinct light sources. To simplify, an assumption may be made that the lights can be partitioned into N subsets $(L_n)_{n=1}^{N}$ each of size K such that all the lights in a given subset are the same color, i.e.

$$(c_\lambda^a = c_n^a, c_\lambda^d c_\lambda^s = c_n^s) \forall \lambda \in L_n$$

This assumption is reasonable for many scenes, in particular when soft shadows are being simulated by placing multiple point light sources at sample positions on an area light source. The illumination node is then programmed so that the color at each pixel is given by the triplet $(I_n^a, I_n^d, I_n^s)$ where these elements are respectively defined as follows:

$$I_n^a = \sum_{\lambda \in L_n} i_\lambda^a s_\lambda, \quad I_n^d = \sum_{\lambda \in L_n} i_\lambda^d s_\lambda, \quad I_n^s = \sum_{\lambda \in L_n} i_\lambda^s s_\lambda \quad (3)$$

The compositing function at illumination node n computes three colors, $p_n^a$, $p_n^d$, and $p_n^s$ where $$p_n^a = p_{n-1}^a + c_n^a I_n^a, p_n^d = p_{n-1}^d + c_n^d I_c^d, p_n^s = p_{n-1}^s + c_n^s I_n^s$$

and $c_n^a$, $c_n^d$ and $c_n^s$ are constants programmed into the compositing hardware on a per-frame or per-scene basis.

The output of node N, the final illumination node in the pipeline, is an image of 9-component pixels $(p_N^a, p_N^d, p_N^s)$, which can be composited with the material colors of the scene in up to four material nodes at the end of the pipeline. The material nodes compute the following pixel color triplets and compositing operations:

Specular material node N+1: $S = (m_r^s, m_g^s, m_b^s)$ $$p_{N+1}^a = p_N^a, p_{N+1}^d = p_N^d, p_{N+1}^s = p_N^s \times S$$

Diffuse material node N+2: $D = (m_r^d, m_g^d, m_b^d)$ $$p_{N+2}^a = p_{N+1}^a, p_{N+2}^{ds} = p_{N+1}^d \times D + p_{N+1}^s$$

Ambient material node N+3: $A = (m_r^a, m_g^a, m_b^a)$ $$p_{N+3}^{ads} = p_{N+2}^a \times (c^a + A) + p_{N+1}^{ds}$$

Emissive material node N+4: $E = (m_r^e, m_g^e, m_b^e)$ $$p^f = E + p_{N+3}^{ads}$$

where $c^a$ is a constant ambient lighting color programmed into node N+3 on a per-frame or per-scene basis. Note that no shadow or lighting computations are done on any of the material nodes, so all texture units are available for rendering the material properties of the scene.

Those of ordinary skill in the art will appreciate that simplifications to the lighting model can be made to reduce the number of material nodes. For example, photorealistic rendering usually assumes no ambient lighting, which removes the need for node N+3. Scenes which do not include light-emitting materials can be rendered without node N+4. A final simplification can be made if the specular material color $m^s$ is the same for all objects. In this case (assuming no ambient or emissive lighting), the compositing function in the illumination nodes is modified to compute $$p^n = p_{N-1}^d + c_n^d I_n^d, p_n^s = p_{n-1}^s + (m^s \times c_n^s) I_n^s \quad (4)$$

and only a single material node is needed which computes $$D = (m_r^d, m_g^d, m_b^d), p^f = p_N^d \times D + p_N^s \quad (5)$$

The implementation in fact may also provide support for global ambient illumination when $c^n = c_n^d$ for some n and either $m^a = 0$ or $m^a = m^d$ for all materials in the scene. Illumination node n is then programmed to compute $$p_n^d = p_{n-1}^d + c_n^d (I_n^d + I^a), p_n^s = p_{n-1}^s + (m^s \times c_n^s) I_n^s \quad (6)$$

where $I^a = 1$ if $m^a = m^d$, 0 otherwise and this may be used, for example, to simulate the light-emitting material in a rendered scene.

The lighting compositing operator (equation 6) has been implemented in the Sepia2a parallel rendering framework using nVidia GeForce4 Ti 4600 cards. A simulation of a Sepia cluster was performed based on compositing hardware designs. The feasibility of using ATI Radeon 8500 cards has been investigated and this is briefly discussed below. Sepia2a is based on the Sepia2 distributed rendering architecture, but supports transmission of the local image from a graphics card directly to the Sepia PCI card using a DVI interface without passing through the host PCI bus. The natural size for a network pixel is 64 bits and illumination node n must compute $p_n^d$ and $p_n^s$ for which are allocated 11 and 10 bits per channel, respectively, leaving 1 bit unused.

Illumination node n renders K lights in K+1 passes. The first K passes are used to generate shadow-maps from the viewpoint of each light in turn, and details for the two graphics cards are set forth below. The final pass renders the image which will be sent to the Sepia card for compositing.

The illumination-node compositor computes an illumination output according to equation 6 so the host graphics card must supply $(I_n^{d+I^a})$ and $I_n^s$ defined in equation 3 and equation 7. The K texture units can be programmed to generate the $S_k$, so it remains to generate $i_k^d$, $i_k^s$ for each light along with $I^a$ and combine the coefficients. Both target graphics cards contain programmable fragment shader stages which can be used for per-pixel lighting computations. In both cases the number of interpolator inputs is severely limited to a four-channel (r, g, b, a) primary color, a three-channel (r, g, b) secondary color, and K four-channel (r, g, b, a) texture values. Since it is desired to use all of the texture units for shadowing $i_k^s$, $i_k^d$, and $I^a$ must be placed in the primary and secondary colors, which permits seven channels in all.

Generation of diffuse and specular illumination components may be limited to at most three unique lights, and place $(i_1^d, i_2^d, i_3^d, I^a)$ in the primary color and $(i_1^s, i_2^s, i_3^s)$ in the secondary color. If K>3 the restriction may be enforced that the K lights must be partitioned into three subsets $G_1$, $G_2$ and $G_3$ such that the light positions $I_k$ are clustered around centers $c_1$, $c_2$ and $c_3$ and $$I_k \approx c_1 \forall k \in G_1$$

On target cards, K is at most 4 so in practice this restriction amounts to placing two of the four lights close together, which is reasonable for an application of soft-shadowing, which clusters many identical lights close together in any case. Since shadow boundaries have much higher spatial frequency than either diffuse or specular lighting variations it is still worthwhile to generate 4 shadows given only 3 lighting locations. It would be possible at the expense of abandoning support for simple ambient lighting to place $i_4^s$ for a fourth light location in the alpha channel of the primary color to account for the higher spatial variation of specular lighting compared with diffuse lighting.

In OpenGL, to place the desired information in the primary and secondary color channels, all material diffuse and specular RGB values are set to (1, 1, 1), while the other specular parameters such as shininess are set according to the desired material properties for each object. Materials for which $m^a = m^d$ have their alpha diffuse material color set to 1, otherwise it is set to 0. Three lights are enabled at locations $c_1$, $c_2$ and $C_3$ with diffuse and specular colors both set to (1, 0, 0, 0), (0, 1, 0, 0) and (0, 0, 1, 0) respectively and programmed with the desired parameters for attenuation, spotlighting or the like. Details of programming the fragment shaders are set forth below. To generate the material node images, the scene may be rendered from the eye's viewpoint with lighting disabled and object colors set to the appropriate material color $m^d$ or $m^s$.

Embodiments of the illumination nodes of the present invention may be implemented on an nVidia GeForce4 Ti 4600 graphics card or the like. The programming model may be similar for other cards in the GeForce3 and GeForce4 Ti series. These cards support depth textures so generating shadow map k is straightforward. A texture map of the desired size is created with internal format DEPTH_COMPONENT24_ARB_OpenGL extensions and the scene is rendered from viewpoint $I_k$ with all lighting, texturing and color buffers disabled. If available the WGL_ARB_render_texture extension can be used to render directly to the texture otherwise the image is rendered to the framebuffer and copied internally to the graphics card using glCopyTexSubImage2D.

Before rendering the scene from the eye's viewpoint, texture k is bound to texture unit k and all texture units are programmed to clamp to a border depth of 1.0, with linear filtering enabled. GL_TEXTURE_COMPARE_ARB_OpenGL extensions is enabled with GL_TEXTURE_COMPARE_OPERATOR_ARB_OpenGL extensions set to GL_TEXTURE_LEQUAL_R_ARB_OpenGL extensions. Coordinate generation is enabled for all four texture coordinates in GL_EYE_LINEAR mode, and the (s, t, r, q) GL_EYE_PLANE values are respectively set to the four rows of the matrix $SF^IM^I$ where $$S = \begin{pmatrix} 0.5 & 0.0 & 0.0 & 0.5 \\ 0.0 & 0.5 & 0.0 & 0.5 \\ 0.0 & 0.0 & 0.5 & 0.5 \\ 0.0 & 0.0 & 0.0 & 1.0 \end{pmatrix}$$

Three general combiner stages may be used, and the program is set forth in Table 1:

TABLE 1

The register combiner program for rendering four shadows on an nVidia GeForce4 Ti graphics card.

| Stage | | |
|---|---|---|
| 0 | spare 0'$_{rgb}$ = | texture0$_{rgb}$ × const0$_{rgb}$ × texture1$_{rgb}$ × (1 − const0$_{rgb}$) |
| 0 | spare 0'$_a$ = | texture2$_a$.1 + texture3$_a$.1 |
| 1 | spare 0'$_{rgb}$ = | spare0$_{rgb}$ × (1 − const1$_{rgb}$) + spare0$_a$ × const1$_{rgb}$ |
| 2 | spare 0'$_{rgb}$ = | spare$_{rgb}$ ● primary$_{rgb}$ |
| 2 | spare 1'$_{rgb}$ = | spare0$_{rgb}$ ● secondary$_{rgb}$ |
| Final | final$_{rgb}$ = | spare0$_{rgb}$ × const0$_{rgb}$ + spare1$_{rgb}$ (1 − const0$_{rgb}$) + primary$_{alpha}$ × const0$_{rgb}$ |

ON ENTRY
Const0 = (1,0,0,0) const1 = (0,0,1,0)
Primary = ($I^d_0$, $i^d_1$, $I^a$) secondary = ($I^s_0$, $i^s_1$, $i^s_2$, 0)
texturek = $s_k$, $s_k$, $s_k$, $s_k$
ON EXIT
final = ($i^d_0 s_0$ + $i^d_1 s_1$ + $i^d_2(s_2 + s_3)$ + $I^a$),
$i^s_0 s_0$ + $i^s_1 s_1$ + $i^s_2(s_2 + s_3)$
$i^s_0 s_0$ + $i^s_1 s_1$ + $i^s_2(s_2 + s_3)$)

The implementation of illumination nodes on a graphics card that does not support depth textures, has been investigated. Although such cards may have K=6 active textures, the depth comparison must typically be performed as part of the fragment shader program and so two texture coordinates must be assigned to each shadow map so at most three shadows can be rendered in a single pass. A 16-bit precision depth comparison can be implemented in a two-pass shader program as opposed to the 24-bit comparison performed by the depth texture functionality on the nVidia card. Unfortunately, percentage-closer filtering is not possible with this implementation and so aliasing artifacts are much more visible.

The algorithm was tested on a set of simple models using an nVidia GeForce4 Ti 4600 graphics card in a Compaq EVO 1.7 GHz P4 workstation running Redhat Linux 7.2. A simulation was made of images as they would be rendered at 800×600 pixels on a 9-node Sepia2a cluster using 512×512-pixel textures for the shadow maps. The local rendering code was run exactly as it would be in an actual system, then the image was grabbed using glReadPixels and a software simulation of the compositing operators was run to generate the final image. Table 2 shows timings measured on a single-machine test setup:

TABLE 2

Rendering Times for Sample Images in ms

| Model/Lights per node | 1 | 2 | 3 | 4 |
|---|---|---|---|---|
| Balls (no shadows) | .98 | 1.13 | 1.43 | 1.44 |
| Balls (walkthrough) | 1.11 | 1.26 | 1.55 | 1.57 |
| Balls (moving lights) | 3.31 | 5.65 | 8.25 | 10.71 |
| Horse (no shadows) | 1.17 | 1.30 | 1.45 | 1.60 |
| Horse (walkthrough) | 1.26 | 1.40 | 1.54 | 1.69 |
| Horse (moving lights) | 2.39 | 3.82 | 5.66 | 7.49 |
| Plant (no shadows) | 1.13 | 1.08 | 1.18 | 1.35 |
| Plant (walkthrough) | 1.24 | 1.21 | 1.29 | 1.47 |
| Plant (moving lights) | 3.47 | 5.64 | 7.98 | 10.70 |
| Box (no shadows) | .54 | .55 | .58 | .62 |
| Box (walkthrough) | .77 | .79 | .81 | .83 |
| Box (moving lights) | 2.04 | 3.53 | 5.31 | 6.98 |

In Table 2, rendering times in ms for four sample images, which are shown rendered with 4 lights per node. Times marked "no shadows" correspond to rendering the scene in full color with OpenGL lighting enabled. Times marked "walkthrough" correspond to rendering the scene with precomputed shadow maps with the fragment shader programmed as described in Table 1. Times marked "moving lights" are as for "walkthrough" but the shadow maps are recomputed at each frame. Timings are given for a single node and the Sepia architecture renders composited frames at approximately the speed of the slowest node in the pipeline.

The Sepia architecture may introduce a latency of approximately two frame refresh periods, while the number of frames rendered per second is approximately that of the slowest node in the pipeline. The nVidia driver that was used for Linux did not support direct rendering to textures, though this is supported by the Windows drivers. The time for the glCopyTexSubImage2D call has been measured to be 1.31 ms per computed shadow map.

An algorithm has been demonstrated which is able to render approximate soft shadows at interactive rates on a cluster of commodity computers linked by a compositing network such as a Sepia2 compositing network. The number of lights scales linearly with the number of available nodes and increasing the number of rendering nodes results in a negligible reduction in performance. For walkthrough applications the new algorithm reduces the number of required rendering nodes by a ratio of 1+ϵ:4 compared with a naive approach, where ϵ→0 as the number of lights increases. For scenes with changing geometry a naive approach renders one shadow per node using 2 rendering passes. The new algorithm must perform K+1 rendering passes to render K shadows, so as long as the timing budget permits at least two shadow maps to be rendered per node the algorithm still decreases the number of required render nodes by a ratio of 1+ϵ:2, while the ratio of 1+ϵ:4 is achieved if the timing budget permits 5 shadow maps per illumination node.

For walkthrough applications it may be advantageous to perform a sort-first decomposition of the scene so that each illumination node renders only a subset of the visible geometry. However, a sort-last scene decomposition may allow better load balancing of distributed rendering than sort-first methods. A sort-last Z-compositing approach is feasible using the algorithm presented here at the expense of transferring more data in each network pixel. Illumination nodes would have to transmit not only the 63-bit diffuse and specular components ($p_n^d p_n^s$) but also (r,g,b,z) channels describing a partially rendered image which would typically be assigned 48 bits in total: 8 bits per channel for color and 24 bits for the Z-buffer. Alternatively it would be possible to use a rendering architecture which supports a "join" operator taking network pixels from more than one preceding render node in the pipeline without increasing the maximum number of bits transmitted in a network pixel.

The algorithm may be modified to allow rendering shadows cast by transparent objects using depth-peeling. Unfortunately the number of rendering nodes used by such an approach is $O(D^2)$ where D is the number of depth-peeling layers, so the exponential increase in the number of nodes may serve as a limitation.

Figure 2:
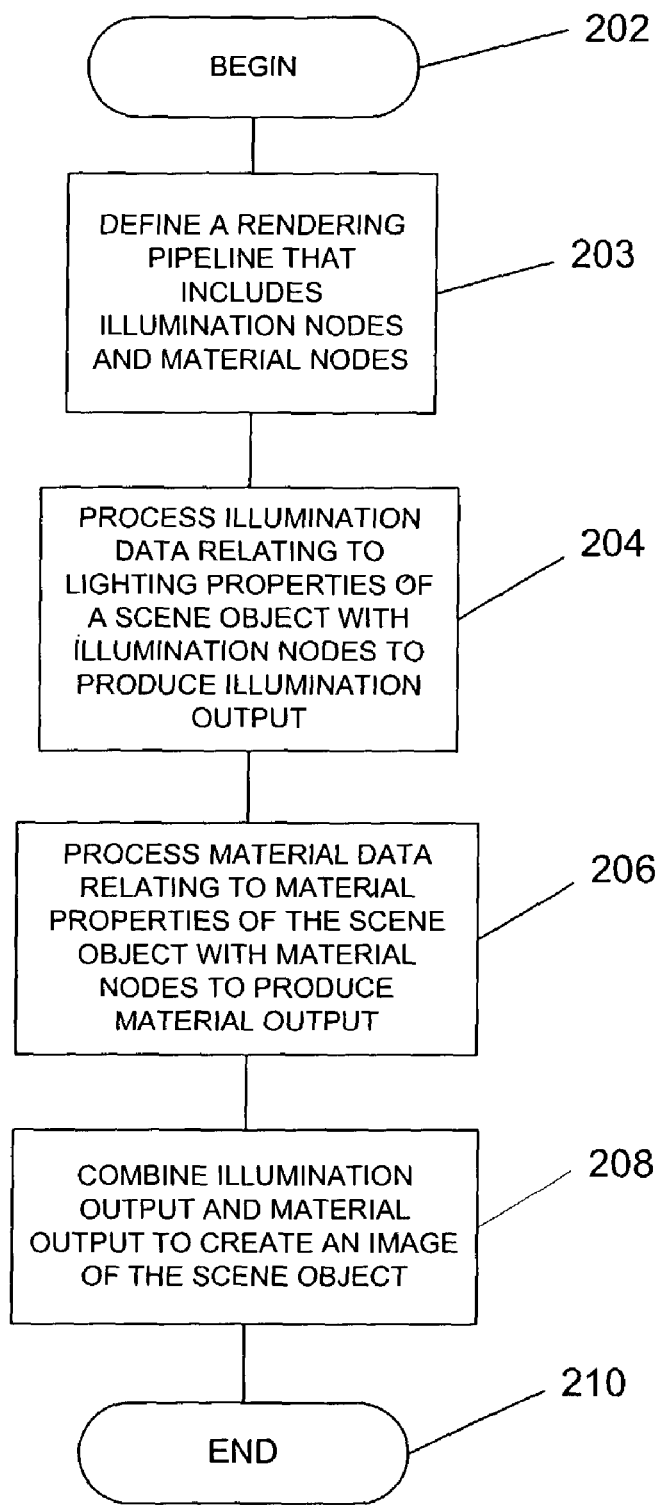
FIG. 2 is a process flow diagram that is useful in explaining the operation of embodiments of the present invention.

FIG. 2 is a process flow diagram that is useful in explaining the operation of embodiments of the present invention. The process is generally referred to by the reference numeral 200. At block 202, the process begins. A distributed rendering pipeline comprising illumination nodes and material nodes is defined at block 203. As described above with reference to FIG. 1, the illumination nodes are used to process data relating to the illumination properties of a scene object and the material nodes are used to process data relating to the material properties of the scene object.

At block 204, the illumination nodes of the distributed rendering pipeline produce an illumination output. The illumination output may be produced without reference to the material properties of the scene object, as set forth above with respect to FIG. 1. At block 206, the material nodes of the distributed rendering pipeline produce a material output. The material output may be produced without data relating to the lighting properties of the scene object, as set forth above with respect to FIG. 1. The material output may be produced in parallel to the illumination output. At block 208, the illumination output and the material output are combined to create an image of the scene object. At block 210, the process ends.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A rendering cluster that renders an image of a scene object, the rendering cluster comprising:
   at least one illumination node that produces illumination output based on lighting properties of the scene object independent of the material properties of the scene object;
   at least one material node that produces material output based on the material properties of the scene object independent of the lighting properties of the scene object;
   wherein the illumination output is combined with the material output to form the image.

2. The rendering cluster set forth in claim 1, wherein the at least one illumination node and the at least one material node comprise a rendering pipeline.

3. The rendering cluster set forth in claim 1, wherein the illumination output comprises soft shadow data.

4. The rendering cluster set forth in claim 1, comprising N illumination nodes, each illumination node comprising K texture units, wherein the rendering cluster processes illumination data from N*K light sources.

5. The rendering cluster set forth in claim 1, wherein the illumination output is computed according to the formula $p^d = p_{N+1}^d + c_n^d I_n^d$, $p_n^s = p_{n-1}^s + (m^s \times c_n^s) I_n^s$, where $p^d$ is a diffuse pixel value, $c_n^d$ is a diffuse constant value, $I_n^d$ is a diffuse illumination value, $p_n^s$ is a specular pixel value, $m^s$ is specular material value, $c_n^s$ is a specular constant, $I_n^s$ is a specular illumination value, and $p_{N+1}^d$ is a diffuse pixel value of node N+1.

6. The rendering cluster set forth in claim 1, wherein the material output is computed according to the formula $D = (m_r^d, m_g^r, m_b^r)$, $p^f = p_N^d \times D + p_N^s$, where $m_r^d$ is red diffuse material value, $m_g^r$ is green radiant material value, $m_b^r$ is blue radiant material value, $p^f$ is a final pixel value, $p_N^d$ is a diffuse pixel value of node N, D is a diffuse material value, $p_N^s$ is a specular pixel value of node N.

7. A rendering cluster that renders an image of a scene object, the rendering cluster comprising:
   at least one illumination node that produces an illumination output based on lighting properties of the scene object according to the formula $$I_n^a = \sum_{\lambda \in L_n} i_\lambda^a s_\lambda, I_n^d = \sum_{\lambda \in L_n} i_\lambda^d s_\lambda, I_n^s = \sum_{\lambda \in L_n} i_\lambda^s s_\lambda;$$

where $I_n^a$ is an ambient illuminence value, $i_\lambda^a s$ is an ambiance value of the $i^{th}$ polygon at $\lambda$, $s_\lambda$ is a specular value of wavelength $\lambda$, $I_n^s$ is a specular illuminence value of vertices, $ni_\lambda^s$ is a specular value of the $i^{th}$ polygon independent of the material properties of the scene object;

at least one material node that produces a material output based on the material properties of the scene object independent of the lighting properties of the scene object;

wherein the illumination output is combined with the material output to form the image.

8. The rendering cluster set forth in claim 7, wherein the at least one material node produces the material output according to the formula $D=(m_r^d, m_g^r, m_b^r)$, $p^f=p_N^d \times D+p_N^s$, where $m_r^d$ is red diffuse material value, $m_g^r$ is green radiant material value, $m_b^r$ is blue radiant material value, $p^f$ is a final pixel value, $p_N^d$ is a diffuse pixel value of node N, D is a diffuse material value, $p_N^s$ is a specular pixel value of node N.

9. The rendering cluster set forth in claim 7, wherein the at least one illumination node and the at least one material node comprise a rendering pipeline.

10. The rendering cluster set forth in claim 7, wherein the illumination output comprises soft shadow data.

11. The rendering cluster set forth in claim 7, comprising N illumination nodes, each illumination node comprising K texture units, wherein the rendering cluster processes illumination data from N*K light sources.

12. A method of producing an image of a scene object, the method comprising:
producing, by an electronic computer, an illumination output based on lighting properties of the scene object independent of the material properties of the scene object;
producing, by the electronic computer, a material output based on the material properties of the scene object independent of the lighting properties of the scene object;
combining, by the electronic computer, the illumination output with the material output to form the image.

13. The method set forth in claim 12, comprising processing the illumination output and the material output with a rendering pipeline.

14. The method set forth in claim 12, comprising incorporating soft shadow data into the illumination output.

15. The method set forth in claim 12, comprising employing N illumination nodes, each illumination node comprising K texture units, to process illumination data from N*K light sources.

16. The method set forth in claim 12, comprising computing the illumination output according to the formula $p^d=p_{N+1}^d+c_n^d I_n^d$, $p_n^s=p_{n-}^s+(m^s \times c_n^s) I_n^s$, where $p^d$ is a diffuse pixel value, $c_n^d$ is a diffuse constant value, $I_n^d$ is a diffuse illumination value, $p_n^s$ is a specular pixel value, $m^s$ specular material value, $c_n^s$ is a specular constant, $I_n^s$ is a specular illumination value, and $p_{N+1}^d$ is a diffuse pixel value of node N+1.

17. The method set forth in claim 12 comprising computing the material output according to the formula $D=(m_r^d, m_g^r, m_b^r)$, $p^f=p_N^d \times D+p_N^s$, where $m_r^d$ is red diffuse material value, $m_g^r$ is green radiant material value, $m_b^r$ is blue radiant material value, $p^f$ is a final pixel value, $p_N^d$ is a diffuse pixel value of node N, D is a diffuse material value, $p_N^s$ is a specular pixel value of node N.

18. The method set forth in claim 12 comprising computing the illumination output and the material output in parallel.

19. A processor-based computer system that comprises an illumination node in a rendering cluster, the rendering cluster rendering an image of a scene object, the processor-based computer system comprising:
a compositing operator that receives illumination data based on lighting properties of a scene object independent of the material properties of the scene object; and
a graphics card for processing the illumination data and providing an illumination output to be combined with output from a material node generated independent of the lighting properties of the scene object to form the image.

20. The processor-based computer system set forth in claim 19, wherein the illumination output comprises soft shadow data.

21. The processor-based computer system set forth in claim 19, wherein the graphics card comprises K texture units to allow processing of illumination data from K light sources.

22. The processor-based computer system set forth in claim 19, wherein the illumination output is computed according to the formula $p^d=p_{N+1}^d+c_n^d I_n^d$, $p_n^s=p_{n-1}^s+(m^s \times c_n^s)I_n^s$, where $p^d$ is a diffuse pixel value, $c_n^d$ is a diffuse constant value, $I_n^d$ is a diffuse illumination value, $p_n^s$ is a specular pixel value, $m^s$ is specular material value, $c_n^s$ is a specular constant, $I_n^s$ is a specular illumination value, and $p_{N+1}^d$ is a diffuse pixel value of node N+1.

23. A processor-based computer system that comprises a material node in a rendering cluster, the rendering cluster rendering an image of a scene object, the processor-based computer system comprising:
a compositing operator that receives material data based on material properties of a scene object independent of the lighting properties of the scene object; and
a graphics card for processing the material data and providing a material output to be combined with output from an illumination node generated independent of the material properties of the scene object to form the image.

24. The processor-based computer system set forth in claim 23, wherein the material output is computed according to the formula $D=(m_r^d, m_g^r, m_b^r)$, $p^f=p_N^d \times D+p_N^s$, where $m_r^d$ is red diffuse material value, $m_g^r$ is green radiant material value, $m_b^r$ is blue radiant material value, $p^f$ is a final pixel value, $p_N^d$ is a diffuse pixel value of node N, D is a diffuse material value, $p_N^s$ is a specular pixel value of node N.

* * * * *

UNITED STATES PATENT AND TRADEMARK OFFICE
CERTIFICATE OF CORRECTION

PATENT NO. : 7,714,858 B2
APPLICATION NO. : 10/418502
DATED : May 11, 2010
INVENTOR(S) : Michael A. Isard et al.

It is certified that error appears in the above-identified patent and that said Letters Patent is hereby corrected as shown below:

In column 4, line 45, after "and" insert -- $m^s$ --.

In column 11, line 7, in Claim 7, delete "illuminence" and insert -- illuminance --, therefor.

In column 11, line 9, in Claim 7, delete "illuminence" and insert -- illuminance --, therefor.

In column 11, line 56, in Claim 16, delete "$p_{n-}{}^s$" and insert -- $P_{n-1}{}^s$ --, therefor.

In column 11, line 58, in Claim 16, after "$m^s$" insert -- is --.

Signed and Sealed this

Sixteenth Day of November, 2010

David J. Kappos
*Director of the United States Patent and Trademark Office*